(12) United States Patent
Webel

(10) Patent No.: US 6,801,616 B1
(45) Date of Patent: Oct. 5, 2004

(54) METHOD FOR TRANSMISSION OF SERVICE SIGNALING MESSAGE, SWITCHING CENTER, CONVERTER NODE, AND SERVICE CONTROL POINT

(75) Inventor: Thilo Webel, Pforzheim (DE)

(73) Assignee: Alcatel, Paris (FR)

( * ) Notice: Subject to any disclaimer, the term of this patent is extended or adjusted under 35 U.S.C. 154(b) by 828 days.

(21) Appl. No.: 09/686,168

(22) Filed: Oct. 12, 2000

(30) Foreign Application Priority Data

Oct. 13, 1999  (DE) .......................... 199 49 316

(51) Int. Cl.⁷ .............................. H04J 3/12; H04M 7/00
(52) U.S. Cl. ...................... 379/230; 370/385; 370/522; 379/221.09
(58) Field of Search ................................ 370/360, 384, 370/385, 496, 522, 524; 379/207.02, 221.08, 221.09, 221.1, 221.13, 221.14, 230

(56) References Cited

U.S. PATENT DOCUMENTS

| | | | | |
|---|---|---|---|---|
| 5,579,385 A | * | 11/1996 | Wille et al. ................. | 379/230 |
| 5,835,584 A | * | 11/1998 | Penttonen .................... | 379/230 |
| 5,867,569 A | * | 2/1999 | Martinez et al. ........ | 379/114.27 |
| 5,892,821 A | * | 4/1999 | Turner .................... | 379/221.08 |
| 6,091,809 A | * | 7/2000 | Stahl et al. ............ | 379/221.09 |
| 6,201,862 B1 | * | 3/2001 | Mercouroff et al. ........ | 379/230 |
| 6,266,406 B1 | * | 7/2001 | Mercouroff et al. ........ | 379/230 |
| 6,289,091 B1 | * | 9/2001 | Lautenschlager et al. ..................... | 379/207.02 |
| 6,317,428 B1 | * | 11/2001 | Mercouroff et al. ........ | 370/360 |
| 6,570,977 B1 | * | 5/2003 | Lautenschlager et al. ..................... | 379/221.02 |
| 6,611,532 B1 | * | 8/2003 | Madour et al. ............. | 370/466 |
| 6,639,981 B1 | * | 10/2003 | Dunn et al. ............ | 379/221.13 |
| 6,647,113 B2 | * | 11/2003 | McCann et al. ........ | 379/221.13 |

\* cited by examiner

*Primary Examiner*—Harry S. Hong
(74) *Attorney, Agent, or Firm*—Sughrue Mion, PLLC

(57) ABSTRACT

The present invention concerns a method, a switching center, a converting node, and a service control point for the transmission of service signaling messages, with service signaling messages being transmitted in sequences through a signaling network between switching centers (SW1, SW2, SW3, SW6). The service signaling messages are each directed from an originating switching center to a destination switching center using a destination code and a converting node (CP) if necessary determines a ported subscriber code assigned to the subscriber code. It is proposed that the originating switching center determine a ported subscriber code and enter it into the those signaling messages as destination code which the originating switching center sends within a sequence of signaling messages following a first signaling message.

9 Claims, 2 Drawing Sheets

METHOD FOR TRANSMISSION OF SERVICE SIGNALING MESSAGE, SWITCHING CENTER, CONVERTER NODE, AND SERVICE CONTROL POINT

The present invention concerns a method according to the pre-characterizing clause of claim 1, an associated switching center according to the pre-characterizing clause of claim 7, an associated converter node according to the pre-characterizing clause of claim 8, and an associated service control point according to the pre-characterizing clause of claim 9.

The invention is based on the conventional transmission of service signaling messages in the CCITT signaling system No. 7.

In order to provide specialized ISDN services (ISDN=integrated services digital network), switching centers of a communication network send service signaling messages over the signaling network to each other. These service signaling messages are messages of the SCCP protocol (SCCP=signaling connection control part). To transmit service signaling messages to a destination switching center, an originating switching center enters in the service signaling messages a so-called global title which is the call number of a subscriber of the destination switching center as destination point code. The service signaling messages are then directed to a special signaling node of the communications network. This signaling node then adds to the global title the so-called signaling point code (SPC) which is the address of the destination switching center within the signaling network. Based on this address, the service signaling messages are then directed through the signaling network to the destination switching center.

However, if a subscriber has "moved" with his call number, i.e., can no longer be reached under his unchanged "personal" call number through the switching center of his former place of residence but rather through a switching center of his new place of residence, and thus into the structure of user channel connections to the switching center of his new place of residence a so-called porting database is inserted in which the call number of the subscriber which is to be ported as well as destination codes to the switching center of his new residence are filed. Also in service signaling messages with respect to the subscriber which must be transmitted in order to render special ISDN services, in the case of such a porting, the global title from the connection exchange area of the switching center of his new residence is no longer entered but rather the global title from the exchange area of the switching center of his new place of residence. In addition, it can be advantageous according to German patent application DE 19805686.9 (internal file no.: 110922) for the aforementioned porting database to also be used. A service signaling message which contains a subscriber code as destination point code is in this way directed to a converting node. In the event of a porting of the subscriber code, the converting node replaces the subscriber code with an assigned, ported subscriber code and in so doing accesses the porting data bank used during connection set-up of a basic channel. To the extent only a single service signaling message which is to be processed in this manner is involved, such a conversion can be managed without problem. However, if several service signaling messages are transmitted within a sequence, it is very time consuming and requires a high level of computing speed for each service signaling message communication to access the porting data base for each service signaling message. In addition, in such an approach, all service signaling messages without exception must be awkwardly directed to the converting node because only in this way can the service signaling message be redirected to the ported destination.

The object of the invention accordingly is to improve the rendering of telecommunication services in which a transmission of service signaling messages for ported call numbers is required.

This object is achieved through a method according to the technical teaching of claim 1 and by a switching center according to the technical teaching of claim 7, a conversion node according to the technical teaching of claim 8, and a service control point according to the technical teaching of claim 9. Additional advantageous embodiments of the invention are contained in the dependent claims and the description.

The invention is based on the idea that as a result of portings of subscriber numbers based on geography or network operator, the routing of service signaling message sequences can be optimized such that a ported subscriber code associated with a former subscriber code is determined only for the first service signaling message, in each case, of a service signaling message sequence through accessing the porting database. The originating switching center which is sending the service signaling message sequence then stores the ported subscriber code and enters it in all service signaling messages within the service signaling message sequence which the originating switching center following the first service signaling message sends to a destination switching center. As a result of the storage of the ported subscriber code in the originating switching center, the time and computing intensive access to the porting database is required only once per service signaling message sequence.

The originating switching center can advantageously query a porting database or a conversion node with a porting database regarding the ported subscriber code.

It is possible in a preferred variant of the invention for the originating switching center to send a first service signaling message of a service signaling sequence to a converting node and for the latter then to determine the ported subscriber code through accessing porting database. The service signaling message sequence is then retransmitted to a destination switching center addressed through the ported subscriber code. The destination switching center then replies to the originating switching station using a response service signaling message from which the originating switching center can determine the ported subscriber code for later use in further service signaling messages of the service signaling message sequence. These further service signaling messages can be transmitted using their now currently applicable ported subscriber code directly to the destination switching center or they can continue to be transmitted via the converting node. In an embodiment according to the invention, the converting node can recognize, however, if a service signaling message is a service signaling message which follows a first service signaling message and already contains a ported, currently valid subscriber code. In this case, the converting node according to the convention omits the time and computing-power intensive access to the porting database.

As a result of the invention, sequences are transferred from service signaling messages correctly and at the same time very efficiently. A change in the service logic is not necessary in order to render the services. The solution according to the invention is also inexpensive and be integrated at low cost into an existing switching system because no changes in the signaling network or in components of the signaling network are necessary. The converting node can be realized particularly inexpensively since for the realization of its function it accesses components which already exist for a different purpose, specifically the porting database and in addition must have essentially only a test function which can distinguish between a first service signaling message and a service signaling message which follows such first service signaling message.

The application of the invention is particularly advantageous in a network environment in which communications networks of various competing network operators exist side by side and in which the requirement for call number portability exists. A further advantageous application case is that of a communications network in which there is a need for call number portability between different subscriber switching stations.

The invention and its advantages will be presented below using an exemplary embodiment and with the help of the drawings.

A first exemplary embodiment of the invention will be explained below with the aid of FIG. 1 and FIG. 2.

Figure 1:
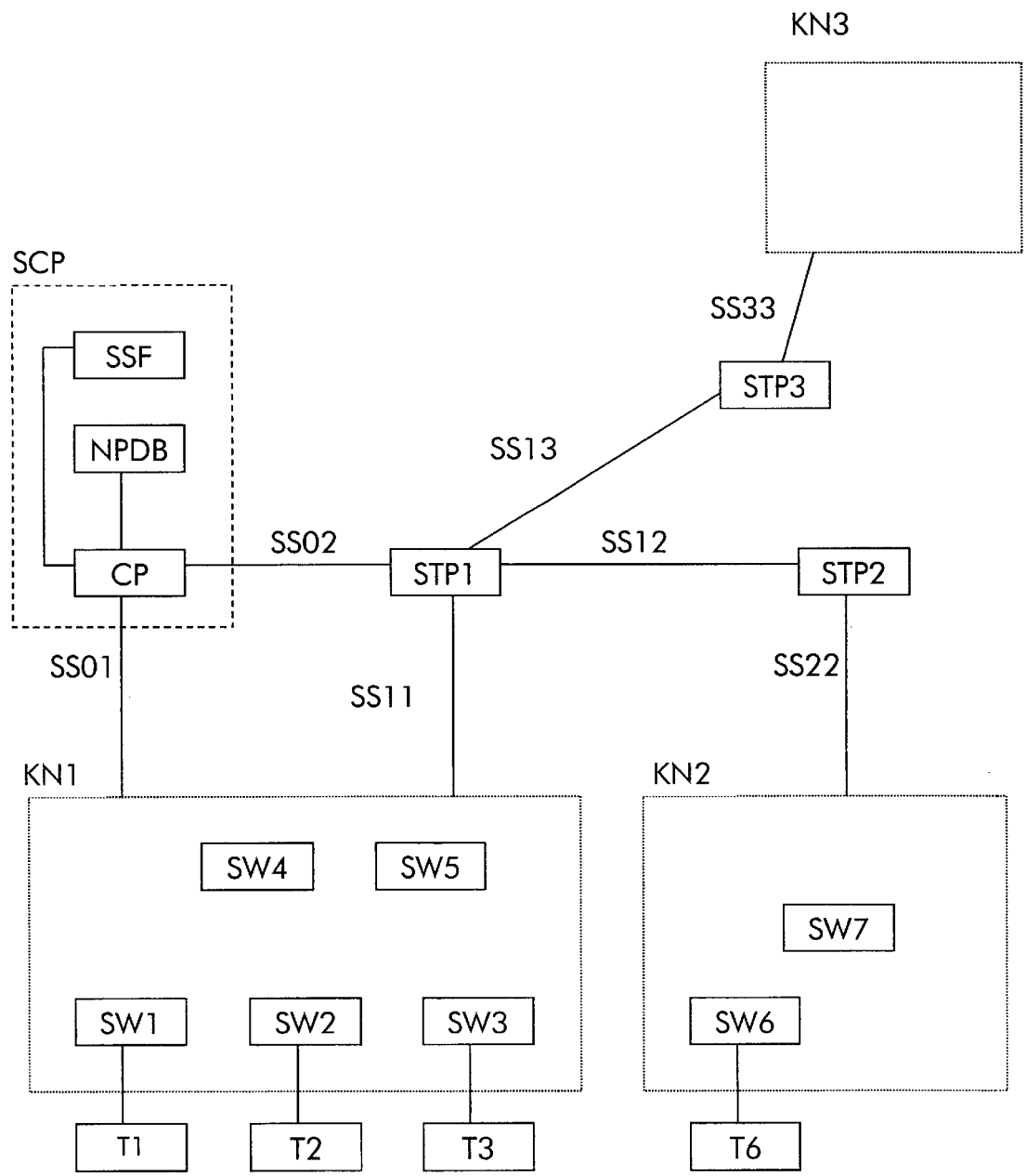
FIG. 1 shows a functional depiction of a communication system for carrying out the method according to the invention with a switching center SW1 according to the invention and a converting node CP according to the invention and a service control point SCP according to the invention.

FIG. 1 shows a communications system with three communications networks KN1, KN2, and KN3, for terminal devices T1, T2, T3, and T6, three signaling nodes STP1, STP2, and STP3, and one service control point SCP with a converting note CP, a database NPDB, and a function block SSF. Between the signaling nodes STP1, STP2, and STP3, the converting node CP, and the communications networks KN1, KN2, and KN3, service signaling messages are sent. Signaling connections SS01, SS11, SS02, SS13, SS12, SS33, and SS22 are used for this purpose.

Communications networks KN1, KN2, and KN3 are advantageously telecommunications networks, e.g., ISDN networks (ISDN=Integrated Services Digital Network) which are assigned to different network operators which share ajoint numbering area. Networks KN1, KN2, and KN3 can also be different, for example communications network KN1 is an ISDN network and communications network KN2 is a mobile telephone network, for example according to the GSM standard, while communications network KN3 is a broadband communications network which in addition to voice communications also makes image communications possible between the subscribers. In addition, call number portability is possible among the subscribers of these communications networks. The number of communications networks KN1, KN2, and KN3 is selected here by way of example. The terminal devices T1, T2, T3, and T6 are terminal devices suitable for connection to communications networks KN1, KN2, and KN3, for example ISDN telephone devices, fax machines, or computers.

Communications networks KN1, KN2, and KN3 each have several switching centers of which switching centers SW1, SW2, SW3, SW4, and SW5 of communications network KN1 and switching stations SW6 and SW7 of communications network KN2 are depicted in FIG. 1, with switching centers SW1, SW2, SW3, and SW6 representing subscriber switching centers to which terminal devices T1, T2, T3, and T6 are connected. Switching centers SW4, SW5, and SW7 represent transit center centers.

Switching centers SW1, SW2, SW3, SW4, and SW5 of communications network KN1 are connected hierarchically through basic channels, with subscriber switching centers SW1 through SW3 representing the lower hierarchical level and transit switching centers SW4 and SW5 representing the upper hierarchical level. In addition, the switching centers are connected to each other via signaling channels through which signaling messages are exchanged between the switching centers. The signaling network formed in this manner corresponds by way of example to CCITT signaling system No. 7 and also contains, in addition to the switching centers, signaling points which are also designated signaling transfer points (STP). These signaling points among other things carry out the switching of signaling messages transmitted over the signaling network. Within the signaling network there is an addressing scheme of its own. Signaling communications are switched by the signaling nodes according to a switching center code, the so-called signaling point code.

The switching centers of communications networks KN2 and KN3 are connected in this manner to each other as are those of communications network KN1, with each of these basic channel bundles connecting two transit switching centers, one of its own communications network and one of the other communications network. Also the signaling networks of communications networks KN1, KN2, and KN3 are connected to each other and form a common signaling network. This linking takes place through linking of signaling nodes of the individual communications networks via signaling channels.

Signaling nodes STP1, STP2, and STP3 represent specially configured signaling nodes of the common signaling network of communications networks KN1, KN2, and KN3. These signaling nodes are able to convert a subscriber code which is entered as destination address in a service signaling message into the switching center code of the switching center to which the subscriber code is assigned, i.e., into the internal addressing scheme of the signaling network. Such a signaling node is also designated signaling relay point.

In database NPDB, porting data is saved, the database NPDB thus representing a porting database. This porting data assigns a porting code to special subscriber codes. These special subscriber codes are the subscriber codes, for example call numbers, of those subscribers which cannot be reached through a terminal device connected to communications network KN1 but rather through a terminal device connected to one of the other communications networks KN2 or KN3. As porting code, a code is then in each case assigned to that communications network through which the subscriber can be reached. It is also possible for a code of the subscriber switching center through which the subscriber can be reached to be assigned as porting code.

A further possibility is that certain number ranges of the subscriber code are reserved for certain communications networks. If a subscriber connected to a communications network corresponding to the number range of his subscriber code, a porting code is assigned to his subscriber code which indicates the particular communications database NPDB under which it can be reached.

As is shown in FIG. 1, database NPDB can be set up on the same computer platform as the function block SSF of service control point SCP which at the same time is the computer platform of the conversion point CP. However, separate, self-sufficient computer platforms are also possible.

Service control point SCP communicates with one or more specially configured switching centers of communications network KN1 through the signaling network. These switching centers have a so-called service switching function and correspond in functionality, as does service control point SCP, to the specifications of IN architecture (IN= intelligent network; see for example ITU-T Recommendation Q 1215), with the service control point having a service logic which provides the following porting service for the constructing basic channel connections through access to the porting database NPDB in communications network.

In a connection setup of a base channel connection, a switching center extracts the called call number as subscriber code of the called subscriber of the call request communication and transports it as payload in an IN signaling message INAPM to service control point SCP. Service control point SCP accesses database NPDB and determines whether a ported code is involved. If it is such a ported subscriber code, it reports the assigned porting code as payload of an IN signaling communication INAPM back to the switching center. The switching center then places the porting code at the front of the subscriber code, and the basic channel is established in accordance with the subscriber code expanded in this manner.

Conversion node CP serves to convert the destination codes, i.e., the destination addresses, from service signaling communications. Such service signaling messages are exchanged between switching centers KN1, KN2, and KN3 and serve for the control of telecommunications services which are rendered by communication networks KN1, KN2, and KN3. Examples of such services are explained below.

A first example is the so-called "call completion on busy subscriber (CCBS)." This service can be activated if a called subscriber is busy. If the service is activated by the calling subscriber, the service logic in the switching center of the called subscriber sends the switching center of the calling subscriber a service signaling message when the called subscriber is no longer busy. Another service is the so-called "short message service (SMS)." In this case, a switching center relays a service signaling message with a short text message to another switching center which then forwards this message to the terminal device of a subscriber connected to it.

In these examples, the service signaling messages are exchanged through the SCCP protocol of signaling system No. 7. From the originating switching center, a subscriber code GT (GT=global title) of a subscriber of the destination switching center is entered into the service signaling message SM(GT1) as destination code. The converting node CP retrieves the destination code, which is the subscriber code GT, from the signaling message SM(GT1 ) and checks by means of accessing database NPDB whether it is ported and accordingly a porting code is assigned to it. If this is the case, it determines by means of accessing the database NPDB the assigned ported subscriber code GT' and replaces the destination code in the service-signaling message SM(GT1) with assigned ported subscriber code GT'. If this is not the case, it does not change the destination code.

Ported subscriber code GT' is determined as follows: If the assigned porting code comprises a network code or operator code of the destination network of the service signaling message SM(GT1), this code is appended to subscriber code GT as a prefix, and the prefix and subscriber code GT together form ported subscriber code GT'. If the porting code consists of a routing code of the destination switching center (also known as "routing number"), to which service signaling message SM(GT1) is-directed, ported subscriber code GT' is formed by the routing code. It is also possible in this case for subscriber code GT to be entered in addition to the routing code, i.e., the two codes together form ported subscriber code GT'.

Figure 2:
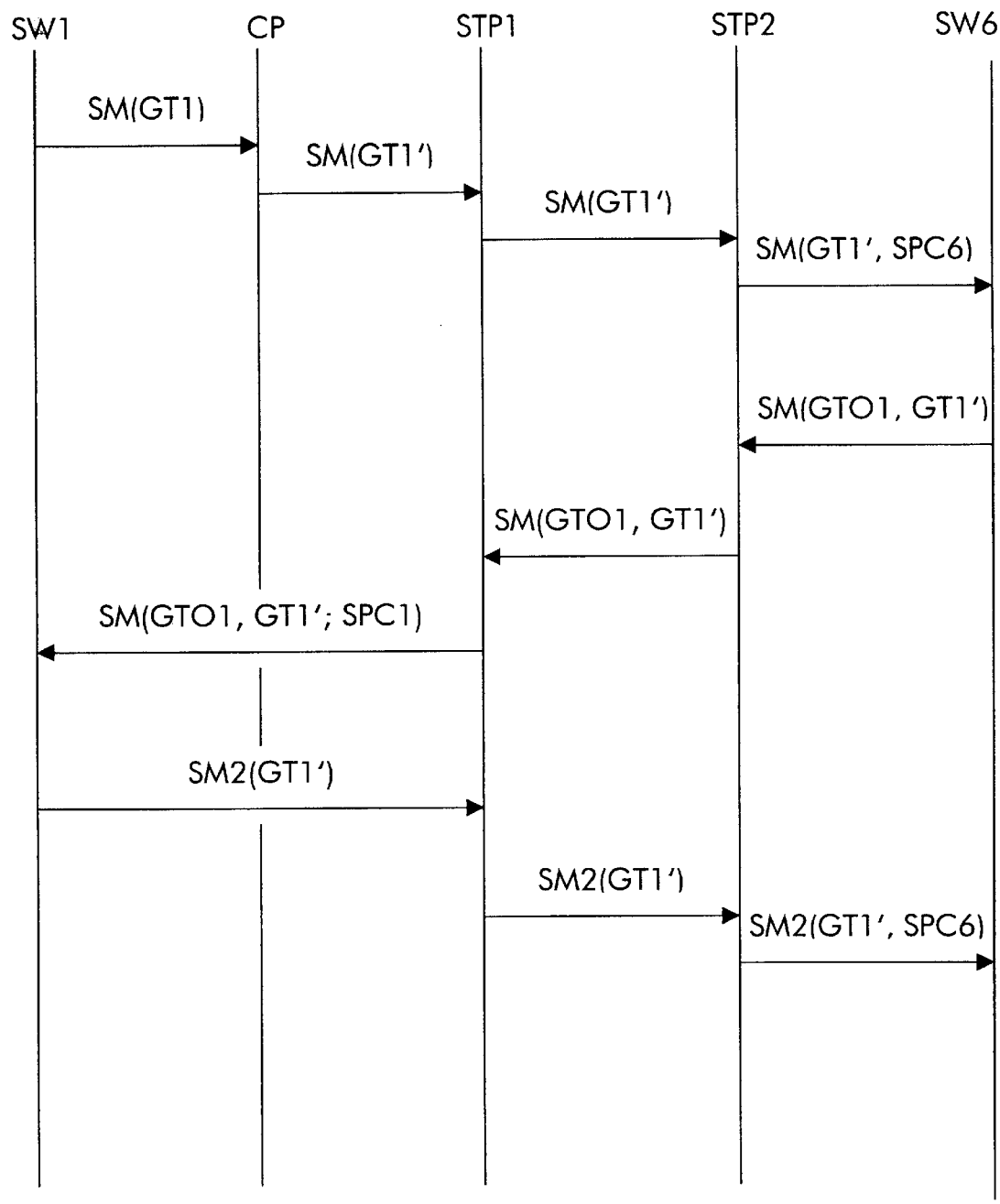
FIG. 2 shows a flow diagram of a transfer of service signaling messages according to a first exemplary embodiment.

FIG. 2 shows a service signaling message flow between switching stations SW1 and SW6 over signaling node STP1 and STP2 and converting node CP.

Originating switching center SW1 generates a service signaling message SM(GT1) which is directed to destination switching center SW6 and contains subscriber code GT1 of a subscriber of this switching center as destination code. In addition, switching center SW1 adds to service signaling message SM(GT1) a source subscriber code GTO1 which is assigned to terminal device T1 which is connected to switching center SW1 and an unambiguous reference code REF which switching center SW1 also saves internally. Service signaling message SM(GT1) by way of example is a first signaling message of a service signaling message sequence of the above described CCBS service. That service signaling message SM(GT1) is a first service signaling message of a service signaling message sequence is indicated, by way of example, by a code TC_BEGIN. Service signaling message SM(GT1) is directed through the signaling network by switching center SW1 to converting node CP which replaces subscriber code GT1 with ported subscriber code GT1' since the assigned subscriber in this exemplary embodiment can be reached over a different communications network, communications network KN2. Service signaling message SM(GT1') with ported subscriber code GT1' as destination code is then directed through the signaling network to signaling node STP1 which recognizes from subscriber code GT1' that service signaling message SM(GT1') is to be directed into communications network KN2 and relays this service signaling message to signaling node STP2 which is responsible for his communication network. Signaling node STP2 adds to scriber code GT1' the switching center code SPC6 of switching center SW6, to which ported subscriber code GT1' is assigned, within communications network KN2 and relays the service signaling message as service signaling message SM(GT1', SPC6). Service signaling message SM(GT1', SPC6) is then directed per code SPC6 by the signaling network to switching center SW6.

Switching center SW6 answers service signaling message SM(GT1', SPC6) with service signaling message SM(GTO1, GT1') which contains reference code REF, a code TC_CONTINUE which replaced code TC_BEGIN, and subscriber code GTO1 as destination subscriber code and subscriber code GT1' as originating subscriber code. Service signaling message SM(GTO1, GT1') is first sent to signaling node STP2 which recognizes from subscriber code GTO1 that service signaling message SM(GTO1, GT1') is to be directed into communications network KN1. Signaling note STP2 relays service signaling node SM(GTO1, GT1') to signaling node STP1 which is responsible for communications network KN1. Signaling node STP1 adds to service signaling message SM(GTO1, GT1') the signaling point code SPC1 of switching center SW1 so that service signaling message SM(GTO1, GT1', SPC1) can be routed through communications network KN1 to switching center SW1. With the aid of reference code REF, switching center SW1 can recognize that service signaling message SM(GTO1, GT1', SPC1) is an answer to service signaling message SM(GT1). Switching center SW1 therefore determines ported subscriber code GT1' from service signaling message SM(GTO1, GT1', SPC1) and enters subscriber code GT1' which switching center SW1 must send to switching center SW6 as a further service signaling message SM2(GT1') in addition to service signaling message sequence, which began with service signaling message SM(GT1).

Converting node CP naturally does not need to be inserted in the return of the answer by switching center SW6 to switching center SW1. According to the invention, however, it now is also no longer inserted in further signaling. If it nevertheless is inserted, it can recognize from code TC_CONTINUE, or as will be explained below, from code TC_END that it can forward the message without processing its contents.

In the described variant of the invention, switching center SW1 saves ported subscriber code GT1', obtained from a reply, along with reference code REF so that switching center SW1 can continue to use ported subscriber code GT1' for further service signaling messages within the service signaling message sequence.

According to another variant, it is also possible for switching center SW1 to query ported subscriber code GT1' which belongs to subscriber code GT1 at converting node CP even before the sending of a first service signaling message and to provide this first service signaling message with the currently valid subscriber code GT1'. This variant must be used at least if although several signaling messages follow one after the other, an answer cannot be definitely expected or if no certain conclusion as to the ported subscriber code can be expected from the answer.

In the example in FIG. 2, service signaling message sequence is concluded with service signaling message SM2 (GT1'). Therefore switching center SW1 enters a code TC_END instead of the code TC_CONTINUE into service signaling message SM2(GT1'). Since the currently valid ported subscriber code GT1' is already entered into service signaling message SM2(GT1'), it can either, as depicted, be routed directly to signaling node STP1 or also be routed through converting node CP. Since in the exemplary embodiment converting node CP is set up according to the invention, it determines using the code TC_END that no ported subscriber code must be specified for service signaling message SM2(GT1') and sends SM2(GT1') to signaling node STP1 without further manipulation. Signaling node STP1 recognizes that service signaling message SM2(GT1') is to be directed into communications network KN2 and relays this service signaling message to signaling node STP2 which is responsible for this communication. Signaling node STP2 adds to subscriber code GT1' the switching center code SPC6 of switching center SW6 within communication network KN2 and relays the service signaling message as service signaling message SM2(GT1', SPC6). Service signaling message SM2(GT1', SPC6) is then directed according to code SPC6 through the signaling network to switching center SW6.

As is depicted in FIG. 2, the method according to the invention can be used between two different communications networks. However, it is also possible for a subscriber of one switching center of communications network KN1 has been ported to another switching center of the same communications network, or example from switching center SW2 to switching center SW3. Also in this case, a service signaling message which by way of example contains subscriber code GT2, is initially directed to converting node CP which then similarly to the example in FIG. 2 translates subscriber code GT2 into a subscriber code GT2' and then forwards the service signaling message to signaling node STP 1. [Signaling node STP1] then adds to subscriber code GT2' a signaling point code SPC3 so that the service signaling message can be forwarded to switching center SW3. Likewise as in the example in FIG. 2, instead of subscriber code GT1, ported subscriber code GT1' is used for further service signaling messages of that service signaling message sequence, in the present example ported subscriber code GT2' is now used for the exchange of service signaling messages between switching centers SW1 and SW3.

The sequences and also the contents of the individual signaling messages can also be differently configured. In particularly, primarily the addresses of the switching centers are often used in the signaling network, while the subscriber address is used again only by the destination switching center. However, this does not change the basic procedure.

In the example depicted, the functions of converting node CP are integrated into one service control point SCP as suggested in FIG. 1 by the dashed frame. Service control point SCP in the example in FIG. 1 provides within an intelligent network so-called service-control functions, represented in FIG. 1 by a function block SSF which correspond to the specifications of the IN architecture (IN= intelligent network; see for example ITU-T Recommendation Q 1215). Furthermore porting database NPDB can be integrated in each case both in converting node CP as well as in service control point SCP.

It is also possible that service control point SCP or converting node CP do not communicate with the switching center of communications network KN1 according to the mechanisms established in the IN specifications. This communication could take place according to proprietary protocols or through the communications infrastructure of an object-oriented data processing system, for example according to the OMG architecture (OMG=object management group).

From the procedures described the required means are apparent without additional inventive step. As a rule, these means are not hardware means but rather appropriately programmed program segments.

What is claimed is:

1. A method for the transmission of service signaling messages through a signaling network between switching centers, said method comprising the steps of transmitting the service signaling messages in sequences of, in each case, at least one signaling message each, and directing each signaling message using a destination code from an originating switching center to a destination switching center, characterized in that the originating switching center determines a ported subscriber code assigned to a subscriber code associated with a subscriber of the destination switching center and wherein said method further comprises said originating switching center entering the ported subscriber code assigned to the subscriber code in those signaling messages as a destination code which the originating switching center transmits within a sequence of signaling messages following a first signaling message.

2. A method according to claim 1 characterized in that the originating switching center determines the ported subscriber code assigned to the subscriber code from a signaling message received as a response to the first signaling message.

3. A method according to claim 1 characterized in that the originating switching center queries a converting node as to the ported subscriber code assigned to the subscriber code.

4. A method according to claim 1 characterized in that in each case at least a first signaling message of a sequence of, in each case, at least one signaling message is routed through a converting node and the converting node replaces a subscriber code of a subscriber of the destination switching center entered as destination code in the signaling message with a ported subscriber code assigned to the subscriber code only when the signaling message is a first signaling message of a sequence of signaling messages.

5. A method according to claim 1 characterized in that the service signaling message represents a message of the SCCP protocol.

6. A method according to claim 1 characterized in that the service signaling message is routed from a converting node to a signaling node and that the signaling nodes add to the subscriber code or the ported subscriber code through a switching center code.

7. An originating switching center for the transmission of service signaling messages through a signaling network between switching centers, where the service signaling messages can be transmitted in sequences of, in each case, at least one signaling message, where the signaling messages each are directed from an originating switching center to a destination switching center with the aid of a destination code entered in the particular signaling message, and where for a subscriber code of a subscriber of the destination switching center which is provided as destination code in a signaling message, a ported subscriber code assigned to the subscriber code can be determined by accessing a porting database, wherein the originating switching center has first means for determining the ported subscriber code assigned to the subscriber code and originating switching center has second means for entering the ported subscriber code assigned to the subscriber code in those signaling messages as destination code which the originating switching center provides for transmitting within a sequence of signaling messages following a first signaling message.

8. A converting node for transmission of service signaling messages over a signaling network between switching centers, where the service signaling messages can be transmitted in sequences of, in each case, at least one signaling message, where the signaling messages each are directed from an originating switching center to a destination switching center with the aid of a destination code entered in the particular signaling message, and where for a subscriber code of a subscriber of the destination switching center which is provided in a signaling message as a destination code, the converting node has first means for determining a ported subscriber code assigned to the subscriber code through the converting node accessing a porting database, characterized in that the converting node has second means for determining whether a signaling message is in each case a first signaling message of a sequence of, in each case, at least one signaling message, and that the converting node has third means for replacing the subscriber code of a subscriber of the destination switching center in each case in the first signaling message with a ported subscriber code assigned to the subscriber code.

9. A service control point for transmission of service signaling messages over a signaling network between switching centers, where the service signaling messages can be transmitted in sequences of in each case at least one signaling message, where the signaling messages each are directed from an originating switching center to a destination switching center with the aid of a destination code entered into the particular signaling message, and where the service control point has first means for determining, for a subscriber code of a subscriber of the destination switching center which is provided as destination code in a signaling message, a ported subscriber code assigned to the subscriber code through the service control point accessing a porting database, characterized in that the service control point has second means for determining whether a signaling message is, in each case, a first signaling message of a sequence of, in each case, at least one signaling message, and that the service control point has third means for replacing the subscriber code of a subscriber of the destination switching center entered as destination code in each case in the first signaling message with a ported subscriber code assigned to the subscriber code.

* * * * *